Sept. 11, 1956 P. MAUBORGNE 2,762,579
FISHING REEL
Filed March 9, 1953 2 Sheets-Sheet 1
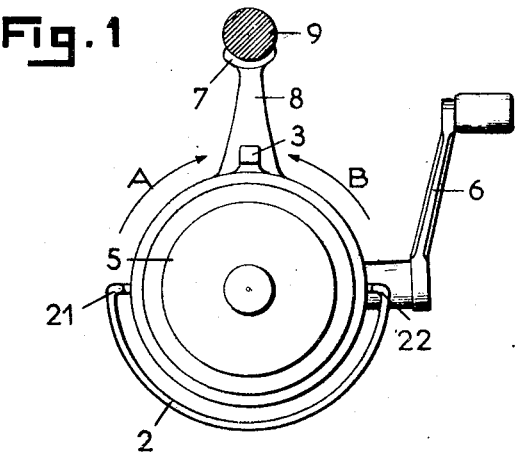
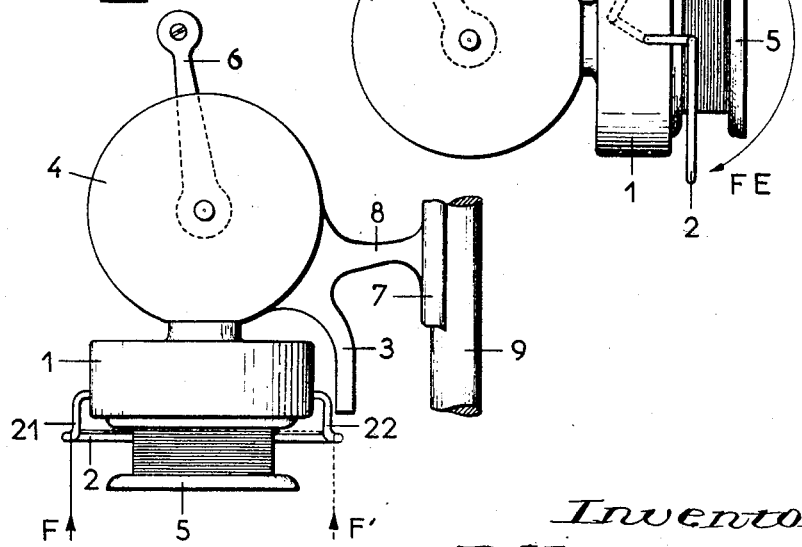
Inventor
P. Mauborgne Sept. 11, 1956  P. MAUBORGNE  2,762,579
FISHING REEL
Filed March 9, 1953  2 Sheets-Sheet 2

Inventor
P. Mauborgne

United States Patent Office 2,762,579
Patented Sept. 11, 1956

2,762,579

FISHING REEL

Paul Mauborgne, Bernouville, France

Application March 9, 1953, Serial No. 341,256

Claims priority, application France March 15, 1952

7 Claims. (Cl. 242—84.1)

The present invention relates to fishing reels of the kind having fixed drums, that is, fishing reels the spool or bobbin of which does not rotate during the unwinding of the line.

In known reels of this kind there is generally a member called a "pick-up" pivotally mounted on a flywheel, or ring, or the like, the "flyer". The purpose of this pick-up member is, when the pick-up member on the flyer is pivoted into the one, the "closed" position to bring about by its rotation with the flyer the winding action of the line or the bobbin, while, when the pick-up member is pivoted into the other, the "open" position, it is off the line and allows the line to wind off freely.

The pick-up which may be in the shape of a curved arm or open ring or loop or have the shape of a bucket handle or bail, that is to say, a loop pivoted at one or both of its ends comprises a part termed the "line collector" which leads and guides the line until the latter reaches the so-called "distributor." It is this distributor which distributes the line on to the bobbin when the pick-up is in its closed position and when there is a relative movement of rotation between the said bobbin and pick-up.

The invention is concerned with a device for moving the pick-up member out of the open, line casting position, where it is disengaged from the line, towards the closed position, where it is to engage and guide the line, and it is particularly an object of the invention to provide means which, as soon as the rotary motion of the flyer sets in, guide the pivoting motion of the pick-up member out of the open or casting position through a considerable angle of its pivotal motion, until a certain dead point position of the pick-up member is passed whereupon the motion into the closed position is completed by a spring, such as I have described and illustrated in my co-pending application Serial No. 257,449 of November 21, 1951.

It is thus an object of the present invention to provide, stationary at the casing, an abutment which slidingly engages and guides the pivotal motion of the pick-up member by remaining in sliding contact with it for as long a period as possible in order to increase the angular motion of the pick-up member before crossing the dead-point.

This extended action of the abutment is brought about in accordance with the present invention by providing, stationary at the casing, an abutment which projects over the flyer, with its free end near the spool-side front thereof. The active part of the abutment which is to be in sliding contact with the pick-up member is thus placed in front of the pivoting axis of the pick-up member, that is, nearer or near to the spool-side front of the flyer, whereas the pivot or pivots of the pick-up member are disposed at said flyer axially, that is referred to the axis of rotation of the flyer, at a distance to the rear of said contacting face.

According to the present invention, the pick-up having the general shape of a closed or open form of loop or bail, along an arched portion constituting a considerable part of its length, engages slidingly the contacting end face of the abutment.

The pick-up member, moreover, is of such a form that its two functions, viz. to engage the line and to guide it on and distribute over the speed are performed by separate parts of the pick-up member, and thus may be more efficiently performed.

Furthermore the arrangement of the abutment in advance of the pivoting line of the pick-up enables the direction of closure of the latter to be reversed.

One constructional example of the device according to the invention will now be described with reference to the accompanying drawing.

Figure 1 represents a diagrammatic face view looking in the direction of the axis of rotation.

Figure 2 is a side view corresponding to Figure 1.

Figure 3 is also a side view with the flyer with the pick-up member turned into a position 90° from the position shown in Figures 1 and 2.

Figure 4:
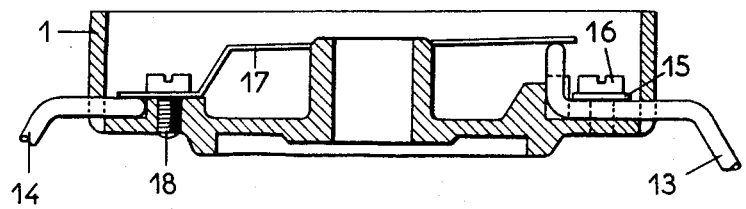
Fig. 4 is a section through the flyer showing the spring device of the fishing reel, corresponding to that of my aforesaid co-pending application Serial No. 257,449 of November 21, 1951, for snapping the pick-up member into its two end positions as soon as the dead point position indicated in this figure is traversed in the one or the other sense.
Figure 5:
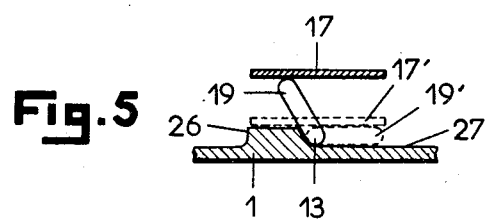
Figure 6:
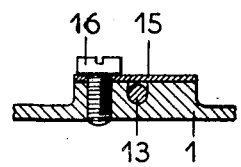

Figs. 5 and 6, respectively, are sections across the right side of the flyer 1 as the flyer appears in Fig. 4.

In the ensuing description and drawing only those parts essential for understanding the invention have been shown and described.

In the drawing 1 is the reel flywheel or flyer on which is pivoted the pick-up 2 at two diametrically opposite points by means of pivots 13, 14.

A conventional crank 6 drives the revolving flyer 1 through the intermediary of any gearing mechanism, which, since it forms no part of the invention, is not shown here. The fishing rod 9 may be fastened to the reel by means of the channeled support 7 and the post 8.

The pick-up made of steel wire has an arched main portion of generally semi-circular plane shape and its radius is greater than that of the flywheel. The configuration of the arched length portion of the pick-up member is such that the radial distances of this portion from the axis of rotation of the flyer, at each point of contact with the free end face, are substantially the same as the radial distance of the free end face of the abutment 3 from this axis of rotation. The outer part or the plane of the semi-circular loop of the pick-up is some distance away from the pivoting axis, as shown in Figure 3, the arched portion and the pivots 13, 14 being connected by means of double bends 21, 22, generally of S or Z form, which are to guide the line when it is wound upon the spool 5.

The pick-up is shown in the closed position in Figures 1, 2 and 3 but its open position is also indicated in Figure 2 by the broken lines into which open or casting position OU the pick-up member may be pivoted by hand from the closed or line winding position FE. In the casting position, the pick-up member, when the flyer starts to rotate, contacts with its arched length portion the contact face or free end face of the abutment 3. This abutment is in the form of an arm, stationary, secured at, or of one piece with, the casing 4 and projecting over the flyer 1. Arm 3 terminates with its free end near the front of the flyer where the spool is mounted coaxially therewith. Thus, while the arched length portion of the pick-up member slides along the free end face of the abutment arm 3, this end face of the abutment pivots the pick-up member out of the open position until it has passed the dead point of its path. Thereupon, as will be explained hereinafter with reference to Figs. 4 to 6, the movement into the closed position will be completed by means of a spring as disclosed in my co-pending application Serial No. 257,449.

The pick-up may be maintained in its open and closed positions by any one of a number of known means, the present invention being independent of this method of control or fixation. This means may be, for purposes of illustration only, as shown in Figs. 4 to 6, a spring 17 which at its one end is secured by means of a screw 18 to the front wall of the flyer 1. End of spring 17 also holds pivot 14 of the pick-up member in position. Spring 17, with its other free end, bears on a crank-shaped extension 19 of pivot 13 of the pick-up member. Spring 17 and crank 19 are so arranged that on the course of the pick-up member from its open position, indicated in full lines at 19 and 17, Fig. 5, to the closed position, broken lines 19' and 17', of the same figure, the pick-up member passes in an intermediate position a dead point, as shown in Fig. 4, from which point the pick-up member will snap under the action of spring 17 either into the closed position or into the open position, ever according to the sense in which the dead point is traversed. The open and closed positions are defined by stops 26, 27, respectively, as Fig. 5 illustrates. Pivot 13 is held in a groove of plate 28 by means of plate 15 and screw 16. It will be observed that the free end or contact face of the abutment 3 is disposed in advance of the pivotal axis of the pick-up so as to accompany the latter as long as possible during its closing motion in order to allow it to pass the dead or neutral point of its movement under or against the action of the spring.

Figure 3 shows clearly that the form of the pick-up makes possible that the line be wound on to a bobbin member 5 when the pick-up rotates in a clockwise direction (initial position F of the line in full line) or in a counterclockwise direction (initial position F' of the line in broken lines) or that the line be wound up in one direction and unwound in the other direction if F and F' correspond to a given state of the winding. It will be seen from Figure 3 that the pick-up 2 turns freely without striking the abutment 3 when in the closed position, since arm 3 projects with clearance over the flyer, and the bent ends 21, 22, of the pick-up member, when the flyer rotates and the pick-up member is in the line engaging and guiding position, may pass through this clearance while the arched length portion of the pick-up member passes at the side of the abutment.

Figure 2 shows the action of the abutment 3 on the pick-up when the latter is in its open position. It can be seen that for the pick-up member to assume the open or the casting position, with subsequent automatic return, some part of the arched portion must engage contact face of abutment 3. In Fig. 1, the pick-up member can be moved to the casting position by "flipping" the same upwardly manually. However, when the pick-up member is 180 degrees from the Fig. 1 position, it should not be moved to the casting position if automatic return operation is desired.

The foregoing example relates to a pick-up capable of acting in both directions of rotation.

It is clear that the invention can be applied also to a pick-up acting only in one direction of rotation, immaterially whether the pick-up in question is of the bucket-handle type or whether it is pivoted on the flywheel at only one end with the other end free and acting as a line distributor.

In the foregoing example the abutment is situated outside the flywheel carrying the pick-up and forms an absolutely fixed point.

What I claim is:

1. A fishing reel including a casing, a spool carried thereby and secured thereto against rotation, a flyer rotatably mounted upon said casing, said spool being disposed in front of said flyer adjoining the same coaxially therewith, means for rotating the flyer, and a pick-up member having at least an angularly bent line winding portion and an arched line guiding portion of a configuration so as to engage the line and guide the same towards said line winding portion, said pick-up member being further formed with at least one end as a pivot journaled within said flyer thereby to be pivoted between a casting position, off the line and the spool, and a line engaging and guiding position, and conversely; an abutment being mounted upon said casing and projecting over the flyer and with its free end near said front of the flyer, said pivot being disposed at the flyer axially at a distance to to the rear of said free end and said front of the flyer, said pick-up member being of a configuration relatively to said abutment and being in spacial relationship thereto to allow the pick-up member, when such member is in the line winding position and when the flyer is rotating, to pass freely with its line winding portion at the side of the abutment and, when the pick-up member is in the casting position and rotation of the flyer is started, to be slightly engaged at said line guiding portion by said free end of the abutment and to be pivoted thereby out of said casting position towards said line engaging and guiding position.

2. A fishing reel including a casing, a spool carried thereby and secured thereto against rotation, a flyer rotatably mounted upon said casing, said spool being disposed in front of said flyer, adjoining the same coaxially therewith, means for rotating said flyer, and a pick-up member with ends formed as pivots journaled within said flyer with the pivots pivotal about a common axis thereby to be pivoted between a casting position, off the line and the spool, and a line engaging and guiding position, and conversely; said pick-up member having angularly bent line winding portions in proximity to said pivots and an arched line guiding portion therebetween of a configuration so as to engage the line and guide the same towards said line winding portion, an abutment being mounted upon said casing and projecting over the flyer and with its free end near said front of the flyer, said pick-up member being of a configuration relatively to said abutment and being in spacial relationship thereto to allow said pick-up member, when such member is in the line winding position and when the flyer is rotating, to pass freely with its line winding portion at the side of said abutment and, when the pick-up member is in the casting position and rotation of the flyer is started, to be slidingly engaged at said line guiding portion by said free end of the abutment and to be pivoted thereby out of said casting position towards said line engaging and guiding position.

3. A fishing reel including a casing, a spool carried thereby and secured thereto against rotation, a flyer rotatably supported at said casing, said spool being disposed in front of said flyer, adjoining the same coaxially therewith, means for rotating said flyer, and a pick-up member having at least an angularly bent line winding portion and an arched line guiding portion of a configuration so as to engage the line and guide the same towards said line winding portion, said pick-up having at least one end formed as a pivot within said flyer to be pivoted between a casting position, off the line and the spool, and a line engaging and guiding position, and conversely; an abutment being mounted upon said casing in the form of an arm projecting with clearance over the flyer and with its free end near said front of the flyer, said pick-up member being of a configuration relatively to said abutment and being in spacial relationship thereto thereby to allow said pick-up member, when such member is in the line winding position and the flyer is rotating, to pass with its line winding portion freely at the side of said abutment and, when the pick-up member is in the casting position and rotation of the flyer is started, to be slidingly engaged at said line guiding portion by said free end of the abutment and to be pivoted thereby out of said casting position towards said line engaging and guiding position.

4. A fishing reel as set forth in claim 1 wherein said line guiding portion of the pick-up member is of a shape that along said portion, referred to the position where said portion is in sliding engagement with the free end of the abutment, the radial distances of said portion from the axis of rotation of the flyer, at each point of contact of said portion with said end face, are substantially the same as the radial distance of said free end of the abutment from said axis of rotation.

5. A fishing reel as set forth in claim 3 wherein said line guiding portion of the pick-up member is of a shape that along said portion, referred to the position where said portion is in sliding engagement with the free end of the abutment, the radial distances of said portion from the axis of rotation of the flyer, at each point of contact of said portion with said end face, are substantially the same as the radial distance of said free end of the abutment from said axis of rotation, whereas the radial distances from said axis of rotation of said portion, near the end, formed as a pivot, are smaller and of a magnitude so as to allow them to pass through said clearance when the flyer is rotating and the pick-up member pivoted into the line winding position.

6. A fishing reel as set forth in claim 2 wherein said abutment is in the form of an arm projecting with clearance over the flyer, and the line guiding portion of the pick-up member is of a shape that along said portion, referred to the position where said portion is in sliding engagement with the free end of said arm, the radial distances of said portion from the axis of rotation of the flyer, at each point of contact of said portion with said end face, are substantially the same as the radial distance of said free end of the abutment from said axis of rotation; and wherein, between said line guiding portion and each of said pivots at the ends of the pick-up member, the line winding portion of the pick-up member is formed with a double bend, generally of Z-form, one bend of each double bend adjacent each of said pivots, the other adjacent said line guiding portion, for catching said line in one of the bends adjacent said guiding portion on clockwise rotation of the flyer, and in the other of said bends adjacent said guiding portion on counter-clockwise rotation of the flyer; said double bends being formed so as to pass freely in part through said clearance and in part in front of said free end of the abutment when the pick-up member is in the line winding position and the flyer is rotating.

7. A fishing reel including a casing, a spool carried thereby and secured thereto against rotation, a flyer rotatably mounted upon said casing, said spool being disposed in front of said flyer, adjoining the same coaxially therewith, means for rotating said flyer, and a pick-up member having at least an angularly bent line winding portion and an arched line guiding portion of a configuration so as to engage the line and guide the same towards said line winding portion, said pick-up member being further formed with at least one end as a pivot journaled within said flyer thereby to be pivoted between a casting position, off the line and the spool, and a line winding position, and conversely; an abutment being mounted upon said casing and projecting over the flyer and with its free end near the said front of the flyer; said pick-up member being of a configuration relatively to said abutment and being in spacial relationship thereto thereby to allow said pick-up member, when such member is in the line winding position and when the flyer is rotating, to pass freely with its line winding portion at the side of said abutment and, when the pick-up member is in the casting position and rotation of the flyer is started, to be slidingly engaged at said line guiding portion by said free end of the abutment and to be pivoted thereby out of said casting position towards said line winding position.

References Cited in the file of this patent
UNITED STATES PATENTS 2,546,465     Martini _____ Mar. 27, 1951

FOREIGN PATENTS 22,701     Great Britain _____ of 1912